(12) United States Patent
Sun et al.

(10) Patent No.: US 12,337,929 B2
(45) Date of Patent: Jun. 24, 2025

(54) KIT OF SCOOTER AND SCOOTER

(71) Applicant: NINEBOT (BEIJING) TECH CO., LTD., Beijing (CN)

(72) Inventors: Wei Sun, Beijing (CN); Tong Wang, Beijing (CN); Wei Li, Beijing (CN); Anqi Sun, Beijing (CN); Ling Zhang, Beijing (CN); Wanyang Qiao, Beijing (CN)

(73) Assignee: NINEBOT (BEIJING) TECH CO., LTD., Beijing (CN)

( * ) Notice: Subject to any disclaimer, the term of this patent is extended or adjusted under 35 U.S.C. 154(b) by 830 days.

(21) Appl. No.: 17/565,863

(22) Filed: Dec. 30, 2021

(65) Prior Publication Data

US 2022/0204112 A1 Jun. 30, 2022

(30) Foreign Application Priority Data

Dec. 31, 2020 (CN) .......................... 202023335400.8

(51) Int. Cl.
*B62K 3/00* (2006.01)
*B62K 5/08* (2006.01)

(52) U.S. Cl.
CPC ................ *B62K 3/002* (2013.01); *B62K 5/08* (2013.01); *B62K 2202/00* (2013.01)

(58) Field of Classification Search
CPC .................................. B62M 7/14; B62B 5/005
See application file for complete search history.

(56) References Cited

U.S. PATENT DOCUMENTS

| 5,036,938 | A  | * | 8/1991  | Blount .................. B62D 61/08 180/68.5 |
| 7,249,774 | B1 | * | 7/2007  | Tyler ..................... B62K 3/002 280/87.041 |
| 9,795,864 | B1 | * | 10/2017 | Bao ......................... B60L 15/00 |
| 10,617,936 | B2 | * | 4/2020  | Koch ................... A63C 17/012 |
| 10,843,061 | B1 | * | 11/2020 | Chung ................. A63C 17/015 |
| 11,033,801 | B2 | * | 6/2021  | Szymczak ............. B62M 13/00 |
| 11,383,150 | B1 | * | 7/2022  | Chung .............. A63C 17/0093 |
| 11,801,892 | B2 | * | 10/2023 | Krammel ............... B62M 27/02 |
| 11,987,316 | B2 | * | 5/2024  | Wang ..................... B62K 13/08 |
| 2006/0272865 | A1 | * | 12/2006 | Lo ......................... B62K 5/025 180/11 |

(Continued)

FOREIGN PATENT DOCUMENTS

CN 204998708 U 1/2016
CN 206218088 U 6/2017

(Continued)

*Primary Examiner* — Kevin Hurley
*Assistant Examiner* — Hosam Shabara
(74) *Attorney, Agent, or Firm* — Frost Brown Todd LLP (57) ABSTRACT

A kit of a scooter and a scooter are provided. The kit includes: a deck assembly; a first steering assembly arranged to a first end of the deck assembly; a driven wheel assembly arranged to the first steering assembly and configured to rotate relative to the deck assembly through the first steering assembly; a second steering assembly arranged to a second end of the deck assembly; a connecting device arranged to the second steering assembly and configured to rotate relative to the deck assembly through the second steering assembly. The connecting device is a device of the kit configured to be connected to a power wheel assembly.

19 Claims, 7 Drawing Sheets

(56) References Cited

U.S. PATENT DOCUMENTS

2011/0266079 A1\* 11/2011 Boyd ..................... B62K 3/002
                                                      180/65.51
2016/0304149 A1\* 10/2016 Ben Meir ................ B62K 5/06
2020/0346100 A1\* 11/2020 Liniado ................ A63C 17/014

FOREIGN PATENT DOCUMENTS

| CN | 109533152 A | 3/2019 |
| CN | 111770875 A | 10/2020 |
| CN | 214138823 U | 9/2021 |

\* cited by examiner

KIT OF SCOOTER AND SCOOTER

CROSS-REFERENCE TO RELATED APPLICATION

This application claims the benefit of priority to Chinese patent Application No. 202023335400.8, filed on Dec. 31, 2020, the content of which is incorporated herein by reference in its entirety.

TECHNICAL FIELD

The present disclosure relates to a field of scooters, and more particularly, to a kit of a scooter and a scooter.

BACKGROUND

With the development of science and technology, an electric skateboard is loved by extreme sports lovers because of its simple structure, strong sense of operation and competitiveness. The electric skateboard is provided with power through a front wheel power system or a rear wheel power system of a deck, and the steering of the deck is controlled through a body.

SUMMARY

Embodiments of a first aspect of the present disclosure provide a kit of a scooter. The kit of the scooter according to the present disclosure includes: a deck assembly; a first steering assembly arranged to a first end of the deck assembly; a driven wheel assembly arranged to the first steering assembly and configured to rotate relative to the deck assembly through the first steering assembly; a second steering assembly arranged to a second end of the deck assembly; a connecting device arranged to the second steering assembly and configured to rotate relative to the deck assembly through the second steering assembly, the connecting device being a device of the kit configured to be connected to a power wheel assembly.

Embodiments of a second aspect of the present disclosure provide a scooter. The scooter according to the present disclosure includes a kit of a scooter and a power wheel assembly. The kit of the scooter according to the present disclosure includes: a deck assembly; a first steering assembly arranged to a first end of the deck assembly; a driven wheel assembly arranged to the first steering assembly and configured to rotate relative to the deck assembly through the first steering assembly; a second steering assembly arranged to a second end of the deck assembly; a connecting device arranged to the second steering assembly and configured to rotate relative to the deck assembly through the second steering assembly, the connecting device being a device of the kit configured to be connected to a power wheel assembly. The power wheel assembly is arranged to the connecting device.

Additional aspects and advantages of the present disclosure will be given in part in the following description, become apparent in part from the following description, or be learned from the practice of the present disclosure.

BRIEF DESCRIPTION OF THE DRAWINGS

The above and/or additional aspects and advantages of the present disclosure will become apparent and easy to understand from following descriptions of embodiments in combination with accompanying drawings.

REFERENCE NUMERALS kit 1 of scooter;

deck assembly 10; first mounting seat 11; second mounting seat 12; deck 13; frame 14; hand grip 140;

first steering assembly 20; third steering bracket 21; fourth steering bracket 22;

first steering shaft 23; first buffer 24; first shaft sleeve 25; bushing 26;

driven wheel assembly 30; second steering assembly 40; first steering bracket 41;

second steering bracket 42; second steering shaft 43; second buffer 44; second shaft sleeve 45;

connecting device 50; first connecting bracket 51; connecting beam 510; connecting seat 511;

second connecting bracket 52; first connecting plate 520; second connecting plate 521;

third connecting plate 522; mounting plate 523; mounting hole 524;

handle lever 60; controller 70; housing 71; button 72; first damping assembly 80; second damping assembly 90;

scooter 2; power wheel assembly 3; power wheel 4; vehicle body 5.

DETAILED DESCRIPTION

Embodiments of the present disclosure are described in detail below. The embodiments described with reference to accompanying drawings are illustrative.

Inventors of the present disclosure find that an electric skateboard is generally used as a light transportation tool. Although the electric skateboard can meet a need of a light travel, it cannot meet entertainment needs of a user.

Therefore, embodiments of the present disclosure provide a kit of a scooter configured to be fitted with different power wheel assemblies. The kit can realize the riding experience of surfing simulation and also has a steering function, thus expanding multiple playing modes.

Embodiments of the present disclosure further provide a scooter.

The kit of the scooter according to the present disclosure includes: a deck assembly; a first steering assembly arranged to a first end of the deck assembly; a driven wheel assembly arranged to the first steering assembly and configured to rotate relative to the deck assembly through the first steering assembly; a second steering assembly arranged to a second end of the deck assembly; a connecting device arranged to the second steering assembly and configured to rotate relative to the deck assembly through the second steering assembly, the connecting device being a device of the kit configured to be connected to a power wheel assembly.

In the kit of the scooter of according to the present disclosure, since the kit of the scooter includes the connecting device, and the connecting device can be connected to the power wheel assembly, the scooter can have a driving power, so that an original transportation tool can realize the riding experience of surfing simulation with three wheels or four wheels, thus increasing the playability. Moreover, the kit of the scooter further includes the first steering assembly and the second steering assembly, so that the scooter can have the steering function, thus expanding multiple playing modes for riding entertainments, extreme sports or light transportation.

In some examples of the present disclosure, the connecting device includes a first connecting bracket and a second connecting bracket, the first connecting bracket is connected to the second steering assembly, the second connecting bracket is connected to a side of the first connecting bracket facing away from the second steering assembly, and the second connecting bracket is a connecting bracket of the connecting device configured to be connected to the power wheel assembly.

In some examples of the present disclosure, the first connecting bracket includes a connecting beam and a connecting seat, the connecting seat is connected to each of two ends of the connecting beam, the connecting beam is connected to the second steering assembly, and the second connecting bracket is connected to the connecting seat.

In some examples of the present disclosure, the second connecting bracket includes a first connecting plate, a second connecting plate, a third connecting plate and a mounting plate, the first connecting plate is connected to the first connecting bracket, the second connecting plate and the third connecting plate are respectively connected to the first connecting plate and arranged opposite to each other, at least one mounting plate is provided, and the at least one mounting plate is connected between the second connecting plate and the third connecting plate and is provided with a mounting hole configured to be connected to the power wheel assembly.

In some examples of the present disclosure, the second steering assembly includes a first steering bracket, a second steering bracket and a steering shaft, the first steering bracket is arranged to the second end of the deck assembly, the second steering bracket is arranged to the connecting device, and the steering shaft is arranged between the first steering bracket and the second steering bracket, to allow the first steering bracket to rotate relative to the second steering bracket.

In some examples of the present disclosure, the steering shaft is arranged obliquely relative to a horizontal plane, and the connecting device is lower than the second end of the deck assembly.

In some examples of the present disclosure, the second steering assembly further includes a buffer arranged between the first steering bracket and the second steering bracket and located on at least one side of the steering shaft.

In some examples of the present disclosure, the second steering assembly further includes a shaft sleeve fitted over the steering shaft and in a clearance fit with the steering shaft, a shaft hole of the second steering bracket is in a interference fit with the shaft sleeve, and a gap is defined between an end face of the shaft sleeve and the first steering bracket.

In some examples of the present disclosure, the kit further includes a handle lever arranged on the deck assembly.

In some examples of the present disclosure, the first end of the deck assembly is provided with a first mounting seat, the second end of the deck assembly is provided with a second mounting seat, and a bottom of the handle lever is mounted on either of the first mounting seat and the second mounting seat.

In some examples of the present disclosure, the deck assembly includes a deck and a frame, the deck is connected to the frame, and at least one of the first mounting seat and the second mounting seat is detachably mounted on the frame.

In some examples of the present disclosure, the kit further includes a controller arranged on the handle lever and provided with a wireless transmitter and/or a wire harness connected to the power wheel assembly.

In some examples of the present disclosure, the controller includes a housing, a circuit board and a button, the circuit board is arranged inside the housing, the button is arranged on a surface of the housing, and the housing is arranged on the handle lever.

In some examples of the present disclosure, the deck assembly includes a deck and a frame, the deck is connected to the frame, a first end of the frame is connected to the first steering assembly, a second end of the frame is connected to the second steering assembly, and the first end of the frame is further provided with a hand grip extending in a direction facing away from the second end of the frame.

In some examples of the present disclosure, the kit further includes a first damping assembly connected between the driven wheel assembly and the deck assembly; and/or the kit further includes a second damping assembly connected between the connecting device and the deck assembly.

The scooter according to the present disclosure includes: the kit of the scooter described above; and a power wheel assembly arranged to the connecting device.

A kit 1 of a scooter 2 according to the embodiments of the present disclosure is described below with reference to FIGS. 1 to 14. The scooter 2 includes the kit 1 and a power wheel assembly 3 arranged to the kit 1.

As shown in FIGS. 1 to 4 and FIGS. 11 to 14, the kit 1 of the scooter 2 is a combined assembly used in combination with a wheel transportation tool having the power wheel assembly 3, and can be sold separately. The kit 1 of the scooter 2 according to the embodiments of the present disclosure includes: a deck assembly 10, a first steering assembly 20, a driven wheel assembly 30, a second steering assembly 40 and a connecting device 50.

The first steering assembly 20 is arranged to a first end of the deck assembly 10, and the driven wheel assembly 30 is arranged to the first steering assembly 20, so that a user can rotate the deck assembly 10 by a certain angle through a change of a center of gravity of his/her body, so as to steer the driven wheel assembly 30 of the scooter 2. The second steering assembly 40 is arranged to a second end of the deck assembly 10. The first end of the deck assembly 10 is an end adjacent to the driven wheel assembly 30, and the second end of the deck assembly 10 is an end away from the driven wheel assembly 30.

In addition, the driven wheel assembly 30 of the present disclosure may include two driven wheels, so that the scooter 2 can move more stably, a braking distance is shorter, and the scooter 2 is safer in an extreme sport mode. Moreover, the scooter 2 after being assembled can adapt to more environments and more road surfaces compared with a transportation tool having a single wheel or two wheels. The transportation tool is not limited to the transportation tool with a single wheel, two wheels or multiple wheels.

As shown in FIGS. 1 to 4 and FIGS. 11 to 14, the connecting device 50 is arranged to the second steering assembly 40, and is a device of the kit 1 configured to be connected to the power wheel assembly 3, so that the scooter 2 can have a driving power. Therefore, the original transportation tool can realize the riding experience of surfing simulation with three wheels or four wheels, so as to increase the playability. Moreover, the original transportation tool thus can also be provided with a steering function, thereby expanding multiple playing modes for riding entertainments, extreme sports or light transportation.

It should be noted that when the scooter 2 steers, through changing the center of gravity of the body of the user, the deck assembly 10 is driven to rotate downward to the left (downward to the right) by a certain angle, and the driven wheel assembly 30 can steer to the left (right) and the power wheel assembly 3 can steer to the right (left) through the first steering assembly 20 and the second steering assembly 40, so that the scooter 2 can steer to the left (right). During steering, the first steering assembly 20 and the second steering assembly 40 steer simultaneously.

Therefore, since the connecting device 50 is arranged to the kit 1 of the scooter 2, the connecting device 50 can be connected to the power wheel assembly 3, so that the scooter 2 can have the driving power. Thus, the original transportation tool can realize the riding experience of surfing simulation with three wheels or four wheels, so as to increase the playability. The kit 1 of the scooter 2 is further provided with the first steering assembly 20 aid the second steering assembly 40, so that the scooter 2 can have the steering function, and the power wheel assembly 3 connected to the connecting device 50 can have various driving modes, which is not limited to a electric drive, but can also be a fuel drive and other fuel cell drives, thus further expanding multiple playing modes for riding entertainments, extreme sports or light transportation.

In addition, it should be noted that after the user has purchased the power wheel assembly 3, he/she does not need to buy the whole scooter 2, but only needs to buy the corresponding kit 1, so that the applicability of the power wheel assembly 3 can be improved. The power wheel assembly 3 may be undetachably arranged to the connecting device 50, for example, the power wheel assembly 3 may be welded to the connecting device 50. The power wheel assembly 3 may also be detachably arranged to the connecting device 50, for example, the power wheel assembly 3 may be arranged to the connecting device 50 by means of fasteners, binding or snapping.

Figure 9:
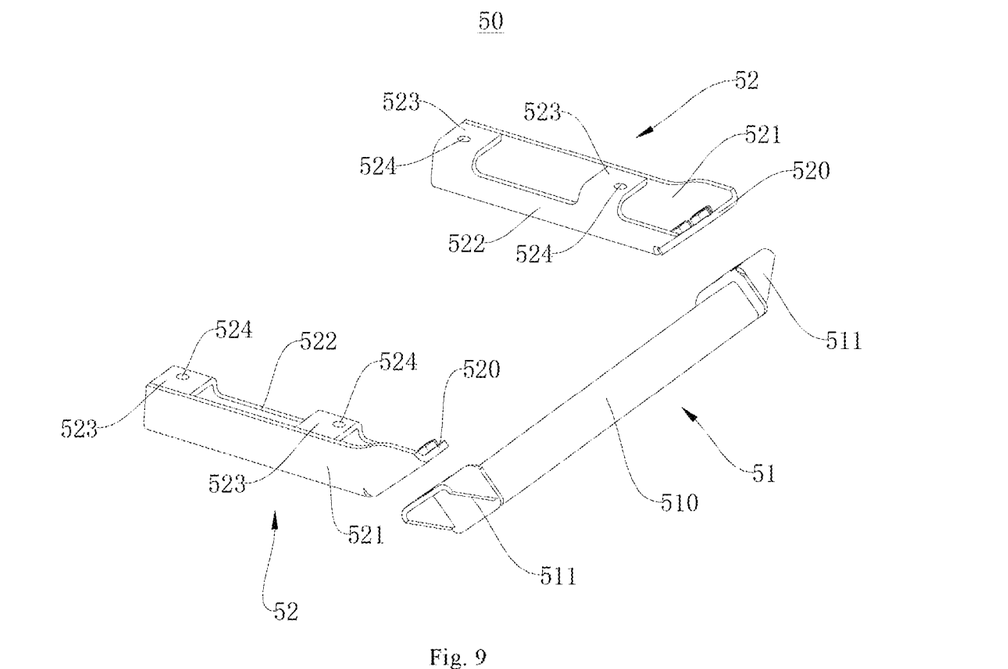
FIG. 9 is an exploded view of a connecting device according to an embodiment of the present disclosure.

According to an embodiment of the present disclosure, as shown in FIG. 9, the connecting device 50 includes a first connecting bracket 51 and a second connecting bracket 52, the first connecting bracket 51 is connected to the second steering assembly 40, the second connecting bracket 52 is connected to a side of the first connecting bracket 51 facing away from the second steering assembly 40, and the second connecting bracket 52 is a connecting bracket of the connecting device 50 configured to be connected to the power wheel assembly 3. The first connecting bracket 51 is connected to the second steering assembly 40, so that the connecting device 50 can rotate relative to the deck assembly 10 through the second steering assembly 40 after the second steering assembly 40 rotates by a certain angle, thus realizing the steering of the scooter 2. Moreover, the second connecting bracket 52 is connected to the side of the first connecting bracket 51 facing away from the second steering assembly 40, and is the connecting bracket of the connecting device 50 configured to be connected to the power wheel assembly 3, so that the connecting device 50 can be connected to the power wheel assembly 3 through the second connecting bracket 52, thus providing the scooter 2 with the driving power. Therefore, the original transportation tool with a single wheel or two wheels can realize the riding experience of surfing simulation with three wheels or four wheels, so as to increase the playability. In addition, the power wheel assembly 3 is detachably connected to the connecting device 50, and a disassembling mode therebetween includes but is not limited to a threaded connection, a snap connection, a locking slide rail connection and a binding connection, etc.

Therefore, through the combination of the first connecting bracket 51 and the second connecting bracket 52, a centralized arrangement of connection positions can be avoided, and an assembling interference between the power wheel assembly 3 and the deck assembly 10 can be avoided. Moreover, the connecting reliability between the first connecting bracket 51 and the second steering assembly 40 can be guaranteed to a certain extent, and the connecting reliability between the second connecting bracket 52 and the power wheel assembly 3 can be guaranteed.

As shown in FIG. 9, the first connecting bracket 51 includes a connecting beam 510 and a connecting seat 511, the connecting seat 511 is connected to each of two ends of the connecting beam 510, and the connecting beam 510 is connected to the second steering assembly 40. The connecting seat 511 is connected to each of the two ends of the connecting beam 510, and the second connecting bracket 52 is connected to the connecting seat 511, so that the first connecting bracket 51 and the second connecting bracket 52 can be integrated into one piece, thus making the connecting device 50 more convenient for use. Moreover, the connecting beam 510 is connected to the second steering assembly 40, so that the connecting reliability of the first connecting bracket 51 and the second steering assembly 40 can be guaranteed.

In some embodiments of the present disclosure, as shown in FIG. 9, the second connecting bracket 52 includes a first connecting plate 520, a second connecting plate 521, a third connecting plate 522 and a mounting plate 523. The first connecting plate 520 is connected to the first connecting bracket 51, and the second connecting plate 521 and the third connecting plate 522 are respectively connected to the first connecting plate 520, and are arranged opposite to each other. At least one mounting plate 523 is provided, and connected between the second connecting plate 521 and the third connecting plate 522, and the at least one mounting plate 523 is provided with a mounting hole 524 configured to be connected to the power wheel assembly 3, that is, the at least one mounting plate 523 is connected to the power wheel assembly 3 through the mounting hole 524.

The first connecting plate 520 is connected to the first connecting bracket 51, so that the first connecting bracket 51 and the second connecting bracket 52 can be integrated into one piece, thus making the connecting device 50 more convenient for use. The second connecting plate 521 and the third connecting plate 522 are respectively connected to the first connecting plate 520, and are arranged opposite to each other, at least one mounting plate 523 is provided, and the at least one mounting plate 523 is connected between the second connecting plate 521 and the third connecting plate 522, so that the structure of the second connecting bracket 52 can be stable and can be better connected to the power wheel assembly 3. Moreover, the at least one mounting plate 523 is provided with the mounting hole 524 configured to be connected to the power wheel assembly 3, so that the mounting plate 523 can be fixedly connected to the power wheel assembly 3 through the mounting hole 524, thus realizing a fixed connection of the connecting device 50 and the power wheel assembly 3. The second connecting bracket 52 can be a bracket formed by bending and welding a plate structure. The first connecting plate 520 is connected to the connecting seat 511 through a fastener after being bent by a certain angle relative to the second connecting plate 521 so that the structural reliability of the second connecting frame 52 can be guaranteed. The third connecting plate 522 is welded with the first connecting plate 520 after being bent, and the mounting plate 523 is also formed by being bent relative to the third connecting plate 522.

As shown in FIG. 9, each second connecting bracket 52 is correspondingly provided with two mounting plates 523 spaced apart from each other, so that connection positions of the second connecting bracket 52 and the power wheel assembly 3 can be increased and the mounting reliability of the power wheel assembly 3 can be improved. In addition, the second connecting bracket 52 arranged in this manner has a high structural strength and a light weight, thus meeting the requirements of the connecting device 50 far the second connecting bracket 52.

Figure 1:
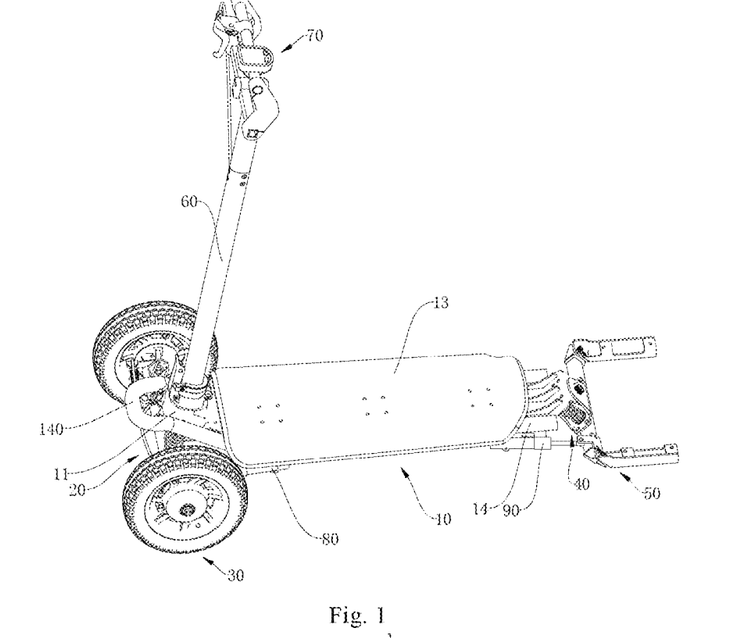
FIG. 1 is a schematic view of a kit of a scooter according to an embodiment of the present disclosure.
Figure 2:
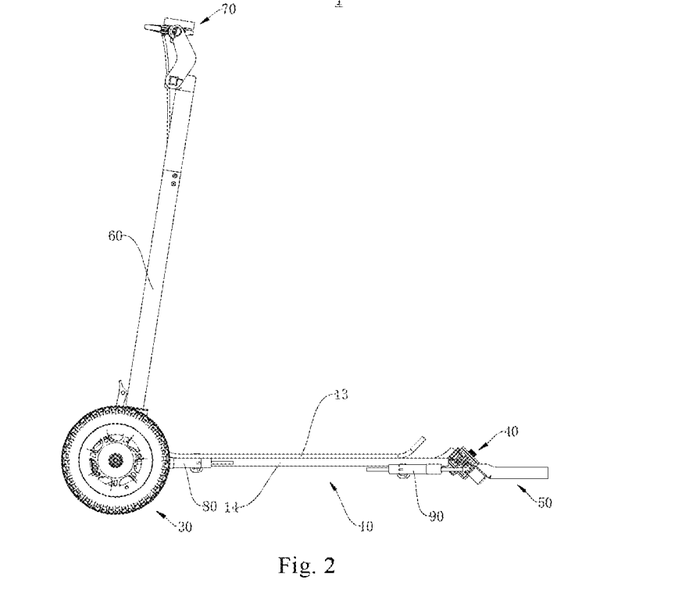
FIG. 2 is a right view of a kit of a scooter according to an embodiment of the present disclosure.
Figure 3:
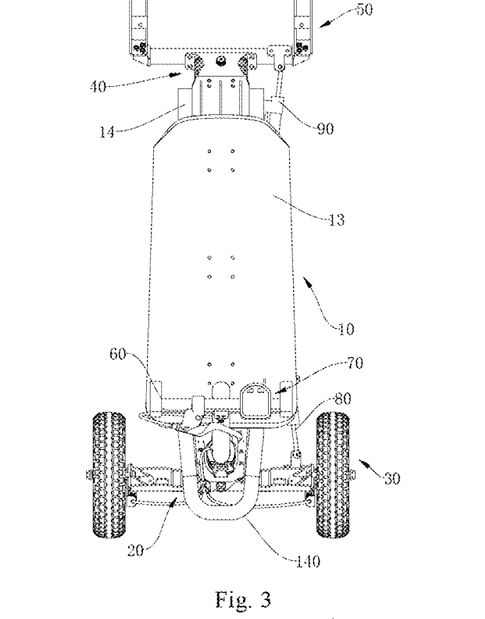
FIG. 3 is a top view of a kit of a scooter according to an embodiment of the present disclosure.
Figure 4:
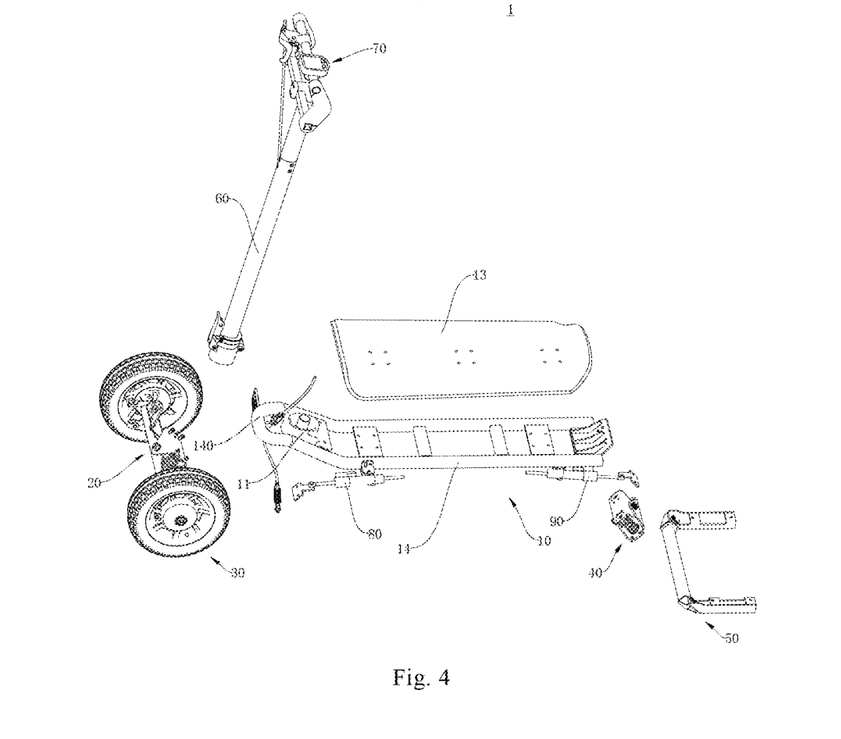
FIG. 4 is an exploded view of a kit of a scooter according to an embodiment of the present disclosure.
Figure 5:
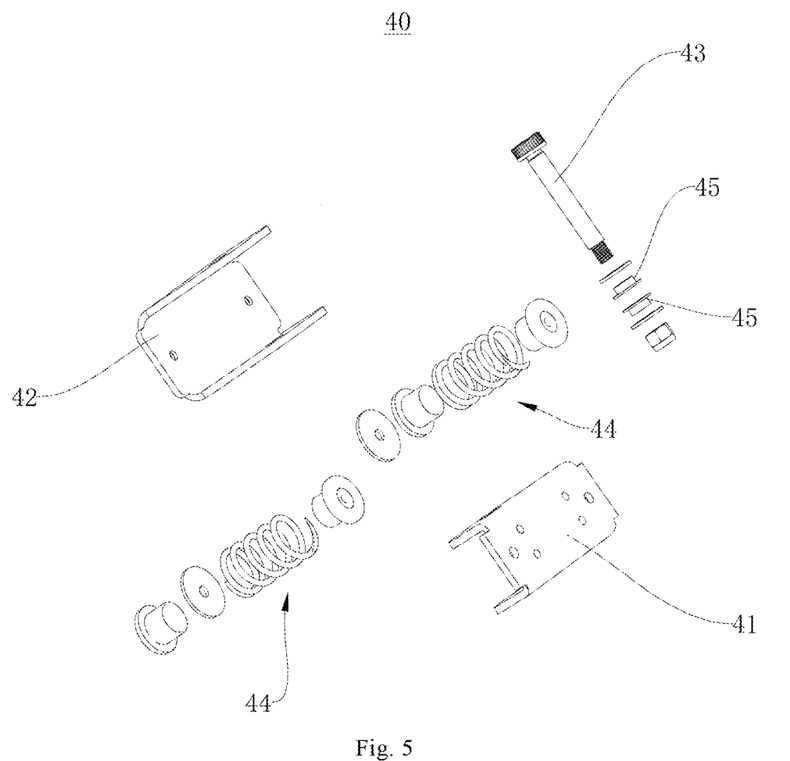
FIG. 5 is an exploded view of a second steering assembly according to an embodiment of the present disclosure.
Figure 6:
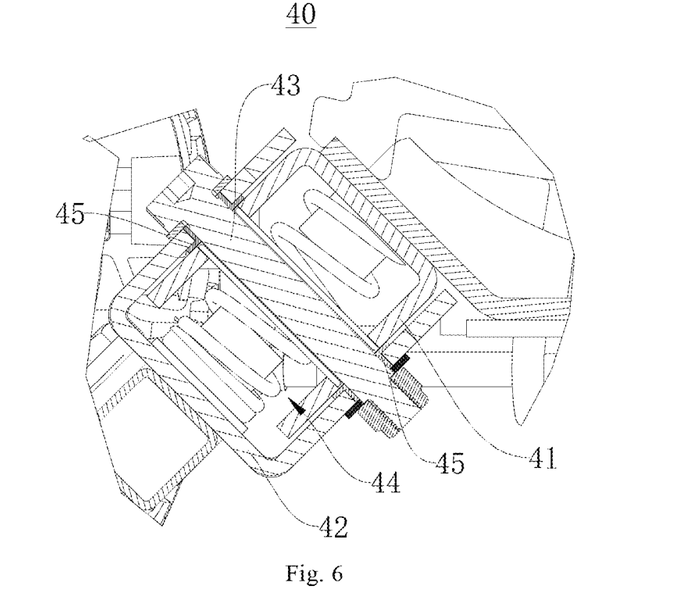
FIG. 6 is a sectional view of a second steering assembly according to an embodiment of the present disclosure.

According to an embodiment of the present disclosure, as shown in FIG. 5 and FIG. 6, the second steering assembly 40 includes a first steering bracket 41, a second steering bracket 42 and a second steering shaft 43. The first steering bracket 41 is arranged to the second end of the deck assembly 10, the second steering bracket 42 is arranged to the connecting device 50, and the second steering shaft 43 is arranged between the first steering bracket 41 and the second steering bracket 42, so as to allow the first steering bracket 41 to rotate relative to the second steering bracket 42. The first steering bracket 41 is arranged to the second end of the deck assembly 10, so as to fixedly connect the second steering assembly 40 to the deck assembly 10. The second steering bracket 42 is arranged to the connecting device 50, so as to fixedly connect the second steering assembly 40 to the connecting device 50. The second steering shaft 43 is arranged between the first steering bracket 41 and the second steering bracket 42, so as to connect the first steering bracket 41 with the second steering bracket 42, and also to allow the first steering bracket 41 to rotate relative to the second steering bracket 42. Thus, the connecting device 50 can rotate relative to the deck assembly 10 through the second steering assembly 40, so that the scooter 2 has the steering function. The first steering bracket 41 and the second steering bracket 42 can be sheet metal structures, and the second steering shaft 43 can be a pin-shaped structure. The first steering bracket 41 is fixedly connected to the deck assembly 10 through but not limited to screws, quick release and welding, and the second steering bracket 42 is fixedly connected to the connecting device 50 through but not limited to screws, quick release and welding. The second steering assembly 40 arranged in this manner has a simple and reliable structure.

As shown in FIG. 5 and FIG. 6, the second steering shaft 43 is arranged obliquely relative to a horizontal plane, and the connecting device 50 is lower than the second end of the deck assembly 10. Since the second steering bracket 42 is arranged obliquely relative to the connecting device 50, the second connecting bracket 52 can be arranged horizontally, so that the power wheel assembly 3 can be better mounted. Moreover, the second steering shaft 43 is arranged between the first steering bracket 41 and the second steering bracket 42, so that the second steering shaft 43 is also arranged obliquely relative to the horizontal plane. The connecting device 50 is lower than the second end of the deck assembly 10, so that the power wheel assembly 3 is more conveniently mounted on the connecting device 50. In addition, the second steering shaft 43 arranged in this manner can also change a transmission direction of a load at the second steering assembly 40, thus improving the structural reliability of the second steering assembly 40.

Further, as shown in FIG. 5 and FIG. 6, the second steering assembly 40 further includes a second buffer 44 arranged between the first steering bracket 41 and the second steering bracket 42 and located on at least one side of the second steering shaft 43. Since the second buffer 44 is arranged between the first steering bracket 41 and the second steering bracket 42, the first steering bracket 41 and the second steering bracket 42 will compress the second buffer 44 when the first steering bracket 41 rotates relative to the second steering bracket 42. The second buffer 44 is elastic and can be compressed and restored, so that the second steering assembly 40 can be rotated and be restored. Moreover, the second buffer 44 is located on the at least one side of the second steering shaft 43, so that the second buffer 44 will not interfere with the second steering shaft 43, and it is also ensured that the second buffer 44 can be compressed between the first steering bracket 41 and the second steering bracket 42. The present disclosure is provided with two second buffers 44 arranged on two sides of the second steering shaft 43 respectively.

In addition, as shown in FIG. 5 and FIG. 6, the second steering assembly 40 further includes a second shaft sleeve 45 fitted over the second steering shaft 43. Moreover, the second shaft sleeve 45 is in a clearance fit with the second steering shaft 43, a shaft hole of the second steering bracket 42 is in an interference fit with the second shaft sleeve 45, and a gap is defined between an end face of the second shaft sleeve 45 and the first steering bracket 41. The second shaft sleeve 45 is fitted over the second steering shaft 43, and the first steering bracket 41 and the second steering bracket 42 are locked through the second steering shaft 43 and the second shaft sleeve 45, so as to realize articulated rotation. The second shaft sleeve 45 is in the clearance fit with the second steering shaft 43, and the shaft hole of the second steering bracket 42 is in the interference fit with the second shaft sleeve 45, so that the locking effect between the first steering bracket 41 and the second steering bracket 42 can be better, thus avoiding the relative sliding therebetween. Further, the gap is defined between the end face of the second shaft sleeve 45 and the first steering bracket 41, so as to have fixing and lubricating functions of a sliding bearing.

Specifically, when the second steering assembly 40 steers, the user drives the deck assembly 10 and the first steering bracket 41 fixedly connected to the deck assembly 10 to rotate by a certain angle around an intersection axis of a longitudinal section and a central plane of the deck assembly 10 through the center of gravity of the body, so as to force the second steering bracket 42 hinged with the first steering bracket 41 through the second steering shaft 43 to rotate by a certain angle, so that the scooter 2 steers. During the steering of the scooter 2, the first steering bracket 41 compresses the second buffer 44 on a corresponding side of the second steering shaft 43 and releases the second buffer 44 on another side of the second steering shaft 43. The second buffer 44 urges the second steering bracket 42 to drive the power wheel assembly 3 to restore when the center of gravity restores.

Figure 7:
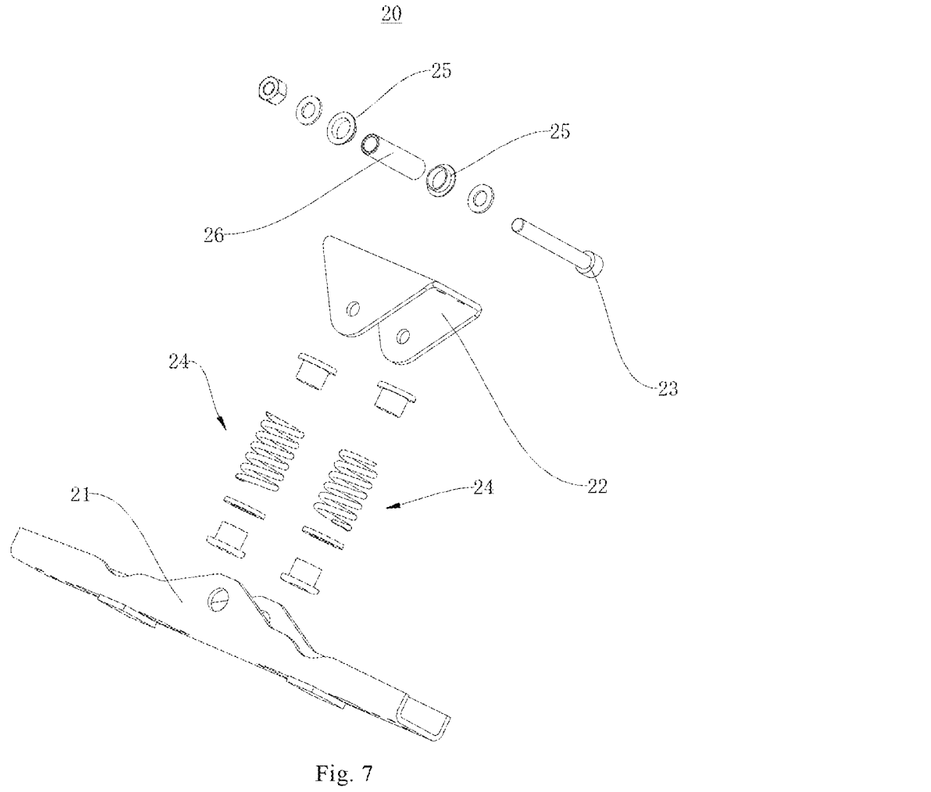
FIG. 7 is an exploded view of a first steering assembly according to an embodiment of the present disclosure.
Figure 8:
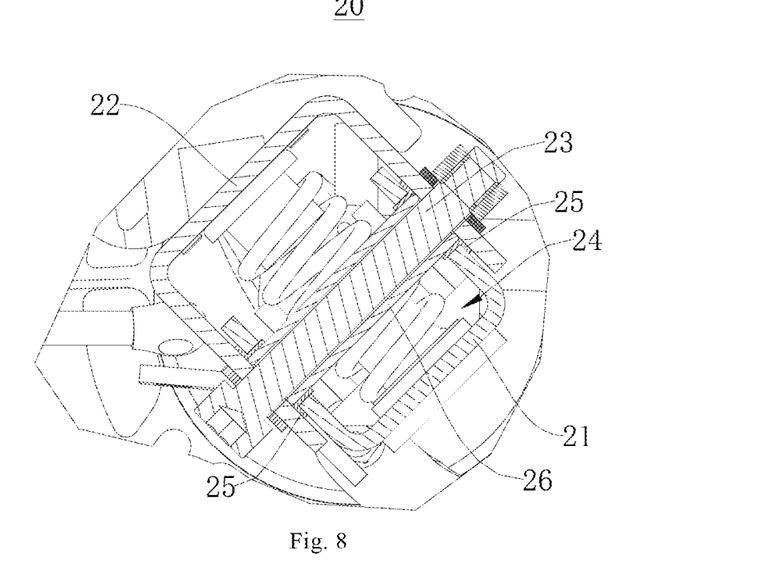
FIG. 8 is a sectional view of a first steering assembly according to an embodiment of the present disclosure.

As shown in FIG. 7 and FIG. 8, the first steering assembly 20 may include a third steering bracket 21, a fourth steering bracket 22, a first steering shaft 23, a first buffer 24 and a first shaft sleeve 25. The third steering bracket 21 is arranged to the driven wheel assembly 30, and the fourth steering bracket 22 is arranged to the first end of the deck assembly 10, so that the driven wheel assembly 30 can rotate relative to the deck assembly 10 through the first steering assembly 20, and thus the scooter 2 can have the steering function. The first steering shaft 23 is arranged between the third steering bracket 21 and the fourth steering bracket 22, so as to allow the fourth steering bracket 22 to rotate relative to the third steering bracket 21. The first buffer 24 is arranged between the third steering bracket 21 and the fourth steering bracket 22. The first buffer 24 is elastic and can be compressed and restored, so that the first steering assembly 20 can be rotated and be restored. The first shaft sleeve 25 is fitted over the first steering shaft 23, and the third steering bracket 21 and the fourth steering bracket 22 are locked through the first steering shaft 23 and the first shaft sleeve 25, so as to realize articulated rotation.

It should be noted that a principle of the first steering assembly 20 is consistent with a principle of the second steering assembly 40. The third steering bracket 21 and the fourth steering bracket 22 can be sheet metal structures, and the first steering shaft 23 can be a pin-shaped structure. However, dimensions of the first steering bracket 41 and the fourth steering bracket 22 and dimensions of the second steering bracket 42 and the third steering bracket 21 are different, dimensions and mounting positions of the second shaft sleeve 45 and the first shaft sleeve 25 are also different, and other parts can be used universally. The fourth steering bracket 22 is fixedly connected to the deck assembly 10 through but not limited to screws, quick release and welding, and the third steering bracket 21 is fixedly connected to the driven wheel assembly 30 through but not limited to screws, quick release and welding.

In addition, as shown in FIG. 7 and FIG. 8, since the first steering assembly 20 is connected to two driven wheels respectively, the first steering assembly 20 has a greater effect on the steering of the scooter 2 and hence bears a greater force. Therefore, a bushing 26 for supporting is additionally provided between the third steering bracket 21 and the fourth steering bracket 22, so as to increase the strength of the first steering assembly 20. The first shaft sleeve 25 is in a clearance fit with the bushing 26, and a shaft hole of the third steering bracket 21 is in an interference fit with the first shaft sleeve 25, so that the locking effect between the third steering bracket 21 and the fourth steering bracket 22 can be better, thus avoiding the relative sliding therebetween. Moreover, a gap is defined between an end face of the first shaft sleeve 25 and the fourth steering bracket 22, so as to have fixing and lubricating effects of a sliding bearing.

Specifically, when the first steering assembly 20 steers, the user drives the deck assembly 10 and the fourth steering bracket 22 fixedly connected to the deck assembly 10 to rotate by a certain angle around the intersection axis of the longitudinal section and the central plane of the deck assembly 10 through the center of gravity of the body, so as to force the third steering bracket 21 hinged with the fourth steering bracket 22 through the first steering shaft 23 to rotate by a certain angle, so that the scooter 2 steers. During the steering of the scooter 2, the fourth steering bracket 22 compresses the first buffer 24 on a corresponding side of the first steering shaft 23 and release the first buffer 24 on another side of the first steering shaft 23. The first buffer 24 urges the third steering bracket 21 to drive the driven wheel assembly 30 to restore when the center of gravity restores.

In addition, when the steering of a front wheel of the scooter 2 and the steering of a rear wheel of the scooter 2 adopt structures having the same principle, the scooter 2 has a simple structure, a convenient assembling, a low cost and a small steering radius, and handling and controlling over the whole scooter are great. However, when the front wheel and the rear wheel of the scooter 2 adopt structures having different principles, for example, the first steering assembly 20 adopts a form of a skateboard bridge and the second steering assembly 40 adopts a form of double bearings, the scooter 2 can have a good stability and a small force arm, and the bearing capacity of the skateboard bridge can be effectively improved.

In some embodiments of the present disclosure, as shown in FIGS. 1 to 4, FIG. 11, FIG. 13 and FIG. 14, the kit 1 further includes a handle lever 60 arranged to the deck assembly 10. The kit 1 is provided with the handle lever 60, and the handle lever 60 is arranged on the deck assembly 10, so that the safety of the scooter 2 when moving driven by the driving power can be improved, and the operation difficulty of the scooter 2 can also be reduced at the same time, thus allowing more users to easily experience the fun of the scooter 2 driven by the driving power.

Figure 13:
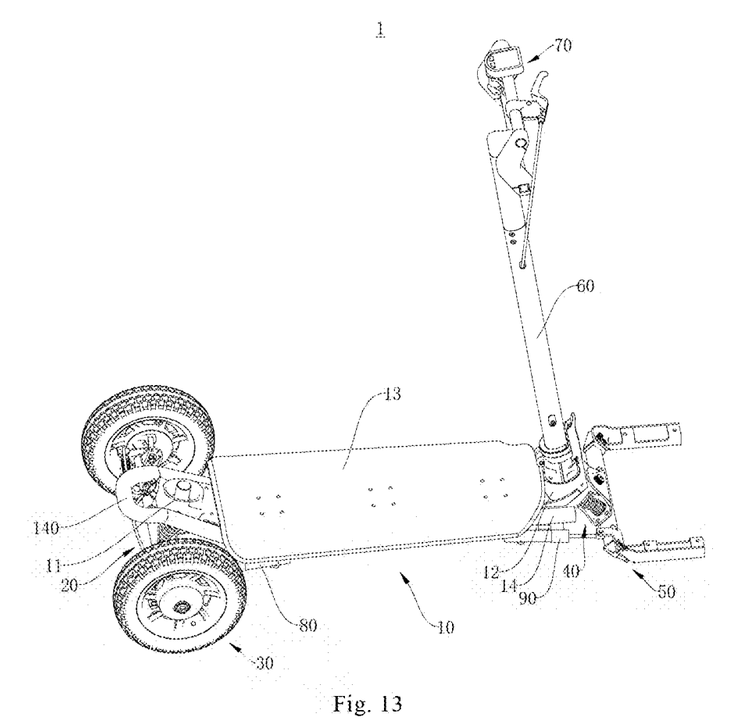
FIG. 13 is a schematic view of a kit of a scooter when a handle lever is mounted on a second mounting seat.

The first end of the deck assembly 10 is provided with a first mounting seat 11, the second end of the deck assembly 10 is provided with a second mounting seat 12, and a bottom of the handle lever 60 is mounted on either of the first mounting seat 11 and the second mounting seat 12. The handle lever 60 is detachably connected to the deck assembly 10, and the deck assembly 10 is provided with the first mounting seat 11 and the second mounting seat 12, so that the handle lever 60 can be moved and mounted on either of the first mounting seat 11 and the second mounting seat 12 after being detached. FIG. 13 shows the kit 1 of the scooter 2 in which the handle lever 60 is mounted on the second mounting seat 12. Therefore, two different driving modes (i.e. a front driving and a rear driving) can be realized, thus bringing the user different riding experiences and increasing the playability. A connection mode of the handle lever 60 includes but is not limited to the threaded connection, the snap connection, the locking slide rail connection, etc., and the detachable handle lever 60 can improve the storage and the portability of the kit 1 of the scooter 2.

Figure 11:
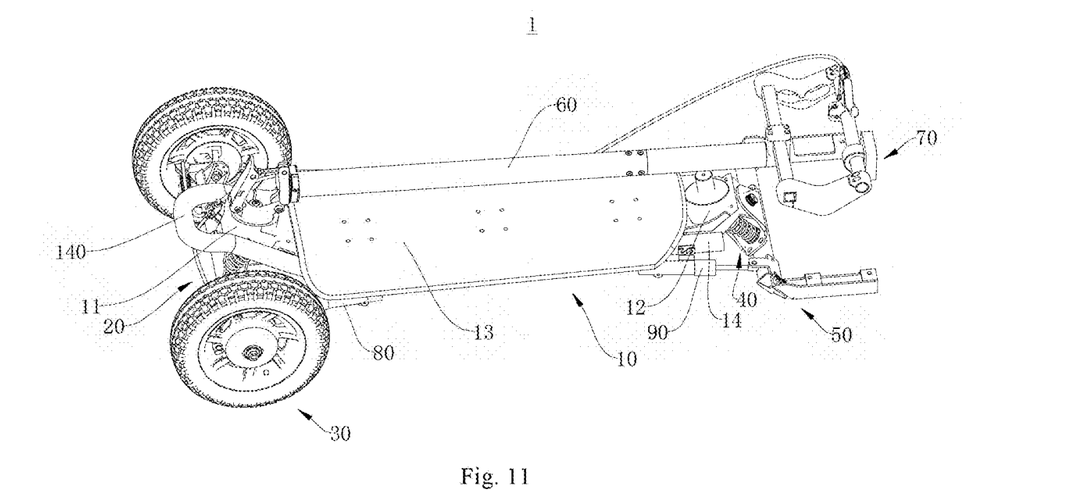
FIG. 11 is a schematic view of a kit of a scooter when a handle lever is folded.
Figure 12:
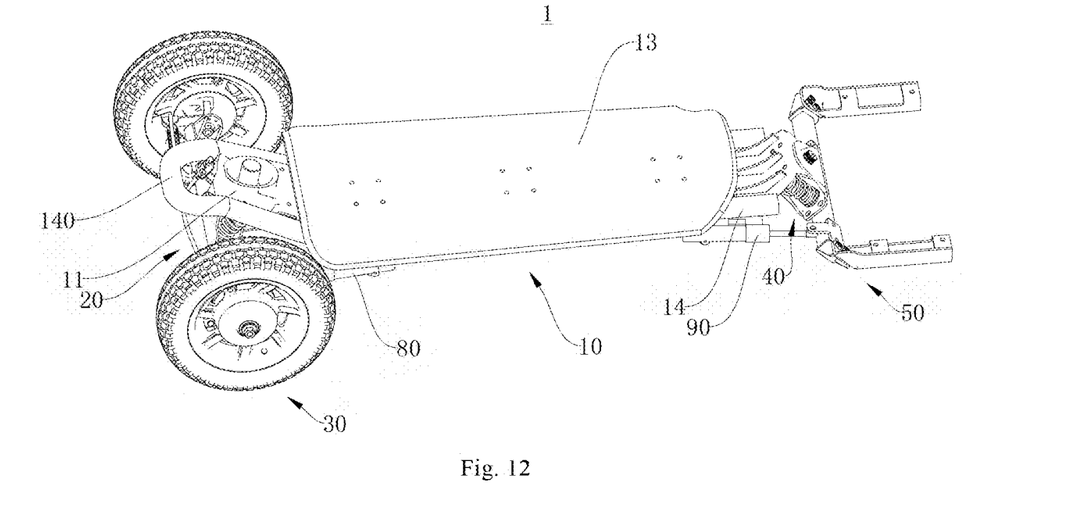
FIG. 12 is a schematic view of a kit of a scooter without a handle lever.

In addition, due to the detachability of the handle lever 60, two modes are added to the kit 1 of the scooter 2, i.e. a mode without the handle lever 60 and a mode with the handle lever 60. FIG. 12 shows the kit 1 of the scooter 2 without the handle lever 60, which can adapt to different levels of riding players. Moreover, the handle lever 60 itself is foldable, and FIG. 11 shows the kit 1 of the scooter 2 when the handle lever 60 is folded, so that the storage and the portability of the kit 1 of the scooter 2 can be improved. Folding and locking manners include but are not limited to snaps or screws.

According to an embodiment of the present disclosure, as shown in FIGS. 1 to 4 and FIGS. 11 to 14, the deck assembly 10 includes a deck 13 and a frame 14, the deck 13 is connected to the frame 14, and at least one of the first mounting seat 11 and the second mounting seat 12 is detachably mounted on the frame 14. The deck 13 is connected to the frame 14, so that a structure of the deck 13 can be more firm and safer when the user stands on the deck 13, and the at least one of the first mounting seat 11 and the second mounting seat 12 is detachably mounted on the frame 14, so that the storage and the portability of the kit 1 of the scooter 2 can be improved.

Further, as shown in FIGS. 1 to 4, FIG. 11, FIG. 13 and FIG. 14, the kit 1 further includes a controller 70 arranged on the handle lever 60 and provided with a wireless transmitter and/or a wire harness connected to the power wheel assembly 3. Thus, the power wheel assembly 3 can be controlled to accelerate or decelerate through the wireless transmitter or the wire harness. A communication mode of the wireless transmitter can be a Bluetooth communication. Therefore, a communication mode between the controller 70 and the power wheel assembly 3 can be a wired communication, the Bluetooth communication and a dual communication of the wired communication combined with the Bluetooth communication. The controller 70 can control the power wheel assembly 3, so as to adjust motion parameters of the scooter 100, and then control the motion of the scooter 100. Therefore, since the handle lever 60 and the controller 70 are arranged on the scooter 100, the control of the scooter 100 is facilitated and the driving safety of the scooter 100 is improved.

On this basis, the controller 70 can be wirelessly connected to a mobile phone APP through Bluetooth, the user can manipulate the scooter 2 to move forward and backward through the mobile phone APP and the controller 70, and the user can also adjust a maximum speed and other riding modes of the scooter 2 through the mobile phone APP.

Figure 10:
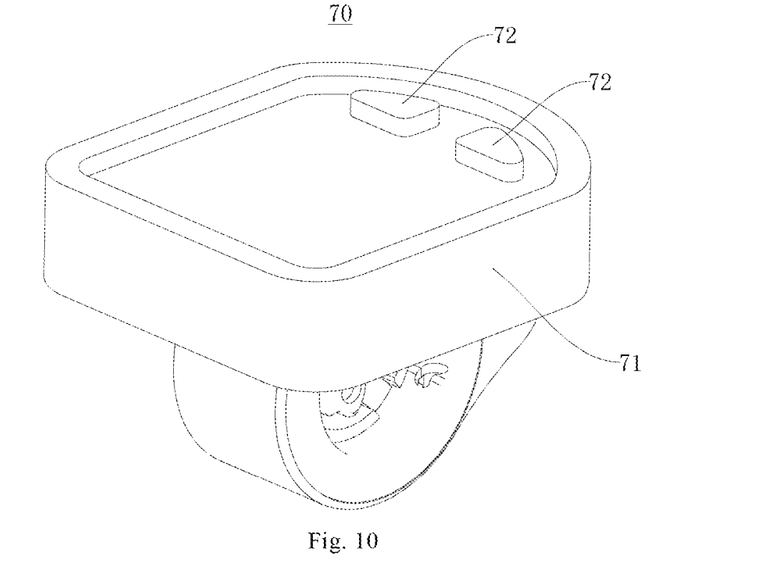
FIG. 10 is a schematic view of a controller according to an embodiment of the present disclosure.

Specifically, as shown in FIG. 10, the controller 70 includes a housing 71, a circuit board and a button 72. The circuit board is arranged inside the housing 71, the button 72 is arranged on a surface of the housing 71, and the housing 71 is arranged on the handle lever 60. The circuit board is arranged inside the housing 71, and the button 72 is arranged on the surface of the housing 71, so that the user can control the circuit board through the button 72, so as to control a motion state of the scooter 2. The button 72 can control functions of a switch, an accelerator, and a brake. The housing 71 is arranged on the handle lever 60, and the controller 70 is detachably connected to the handle lever 60 through the housing 71. A connection mode between the housing 71 and the handle lever 60 includes but is not limited to snaps and screws, and the detachable controller 70 can improve the storage and the portability of the kit 1 of the scooter 2.

In some embodiments of the present disclosure, as shown in FIGS. 1 to 4 and FIGS. 11 to 14, a first end of the frame 14 is connected to the first steering assembly 20, and a second end of the frame 14 is connected to the second steering assembly 40. Since the user stands on the deck 13, the deck 13 is arranged on the frame 14, the first end of the frame 14 is connected to the first steering assembly 20, and the second end of the frame 14 is connected to the second steering assembly 40, so that the first steering assembly 20 and the second steering assembly 40 can steer correspondingly through the change of the center of gravity of the user on the deck 13, mid the frame 14 can move and steer simultaneously with the first steering assembly 20 and the second steering assembly 40, thus maintaining the consistency of the action of the scooter 2 and facilitate the operation and the control of the user.

As shown in FIG. 1, FIG. 3, FIG. 4, FIGS. 11 to 14, the first end of the frame 14 is further provided with a hand grip 140 extending in a direction facing away from the second end of the frame 14. The first end of the frame 14 is further provided with the hand grip 140 extending in the direction facing away from the second end of the frame 14, and the hand grip 140 is U-shaped, so that when the user does not use the scooter 2, he/she can grip the hand grip 140 by hands and walk with pulling the scooter 2 like a luggage case; when the user places the kit 1 of the scooter 2, he/she can also use the hand grip 140 to hang the kit 1 of the scooter 2 vertically on a wall or a storage rod, thus improving the portability and the storage of the kit 1 of the scooter 2.

In addition, as shown in FIGS. 1 to 4 and FIGS. 11 to 14, the kit 1 further includes a first damping assembly 80 and a second damping assembly 90, the first damping assembly 80 is connected between the driven wheel assembly 30 and the deck assembly 10, and the second damping assembly 90 is connected between the connecting device 50 and the deck assembly 10. When the scooter 2 driven by the driving power travels to a high speed, it often swings at a high frequency and will be out of control, which may cause the user to fall off the scooter 2 to damage his/her body. The first damping assembly 80 is arranged between the driven wheel assembly 30 and the deck assembly 10, and the second damping assembly 90 is arranged between the connecting device 50 and the deck assembly 10, so that the first damping assembly 80 and the second damping assembly 90 can be used to optimize the swing problem of the scooter 2 driven by the driving power when travelling at the high speed, thus increasing the stability of the scooter 2, and making the scooter 2 more controllable when travelling at the high speed. Therefore, the scooter 2 is suitable for players pursuing the ultimate surfing experience. In some embodiments of the present disclosure, the first damping assembly 80 and the second damping assembly 90 can also be detached when the scooter 2 travels at a low speed. A damping mode includes but is not limited to a hydraulic damping, a pneumatic damping and a spring damping, etc.

Figure 14:
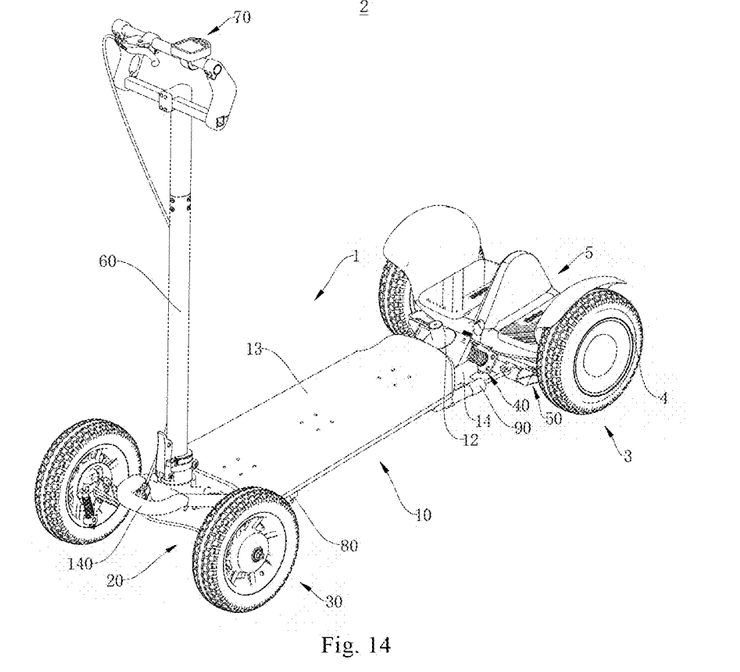
FIG. 14 is a schematic view of a scooter according to another embodiment of the present disclosure.

As shown in FIG. 14, the scooter 2 according to the embodiments of the present disclosure includes the power wheel assembly 3 and the kit 1 of the scooter 2 described in the above embodiments. The power wheel assembly 3 is arranged to the connecting device 50 so that the scooter 2 can have the driving power.

As shown in FIG. 14, the power wheel assembly 3 is a balance vehicle, so that the balance vehicle can be used separately. The balance vehicle includes two power wheels 4 and a vehicle body 5, the two power wheels 4 are arranged to two ends of the vehicle body 5, and at least a part of the connecting device 50 is fixedly connected to a bottom of the vehicle body 5. The two ends of the vehicle body 5 are provided with the two power wheels 4, so that the scooter 2 can move, and the two power wheels 4 are arranged to allow the scooter 2 to travel more safely and adapt to more terrains. Moreover, the at least part of the connecting device 50 is fixedly connected to the bottom of the vehicle body 5, and the connecting device 50 is fixedly connected to the second steering assembly 40, so that the two power wheels 4 can steer through the second steering assembly 40, so as to realize the steering of the scooter 2.

In the description of the present disclosure, it shall be understood that terms such as "central," "longitudinal," "transverse," "length," "width," "thickness," "upper,"

"lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In the description of the present disclosure, "first feature" and "second feature" may include one or more of the features. In the description of the present disclosure, "a plurality of" means two or at least two. In the description of the present disclosure, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. In the description of the present disclosure, a first feature "on," "above," or "on top of" a second feature may include an embodiment in which the first feature is right or obliquely "on," "above," or "on top of" the second feature, or just means that the first feature is at a height higher than that of the second feature.

Reference throughout this specification to "an embodiment," "some embodiments," "an exemplary embodiment," "an example," "a specific example," or "some examples," means that a particular feature, structure, material, or characteristic described in connecting with the embodiment or example is included in at least one embodiment or example of the present disclosure. Thus, the exemplary descriptions of the above terms throughout this specification are not necessarily referring to the same embodiment or example.

Although embodiments of the present disclosure have been shown and described, it would be appreciated by those skilled in the art that various changes, modifications, alternatives and variations may be made in the embodiments without departing from principles and purposes of the present disclosure. The scope of the present disclosure is defined by the claims and their equivalents.

What is claimed is:

1. A kit of a scooter, comprising:
   a deck assembly;
   a first steering assembly arranged to a first end of the deck assembly;
   a driven wheel assembly arranged to the first steering assembly and configured to rotate relative to the deck assembly through the first steering assembly;
   a second steering assembly arranged to a second end of the deck assembly; and
   a connecting device arranged to the second steering assembly and configured to rotate relative to the deck assembly through the second steering assembly, the connecting device being a device of the kit configured to be connected to a power wheel assembly;
   wherein the connecting device comprises a first connecting bracket and a second connecting bracket, the first connecting bracket is connected to the second steering assembly, the second connecting bracket is connected to a side of the first connecting bracket facing away from the second steering assembly, and the second connecting bracket is a connecting bracket of the connecting device configured to be connected to the power wheel assembly.

2. The kit of the scooter according to claim 1, wherein the first connecting bracket comprises a connecting beam and a connecting seat, the connecting seat is connected to each of two ends of the connecting beam, the connecting beam is connected to the second steering assembly, and the second connecting bracket is connected to the connecting seat.

3. The kit of the scooter according to claim 1, wherein the second connecting bracket comprises a first connecting plate, a second connecting plate, a third connecting plate and a mounting plate, the first connecting plate is connected to the first connecting bracket, the second connecting plate and the third connecting plate are respectively connected to the first connecting plate and arranged opposite to each other, at least one mounting plate is provided, and the at least one mounting plate is connected between the second connecting plate and the third connecting plate and is provided with a mounting hole configured to be connected to the power wheel assembly.

4. The kit of the scooter according to claim 1, wherein the second steering assembly comprises a first steering bracket, a second steering bracket and a steering shaft, the first steering bracket is arranged to the second end of the deck assembly, the second steering bracket is arranged to the connecting device, and the steering shaft is arranged between the first steering bracket and the second steering bracket, to allow the first steering bracket to rotate relative to the second steering bracket.

5. The kit of the scooter according to claim 4, wherein the steering shaft is arranged obliquely relative to a horizontal plane, and the connecting device is lower than the second end of the deck assembly.

6. The kit of the scooter according to claim 4, wherein the second steering assembly further comprises a buffer arranged between the first steering bracket and the second steering bracket and located on at least one side of the steering shaft.

7. The kit of the scooter according to claim 4, wherein the second steering assembly further comprises a shaft sleeve fitted over the steering shaft and in a clearance fit with the steering shaft, a shaft hole of the second steering bracket is in a interference fit with the shaft sleeve, and a gap is defined between an end face of the shaft sleeve and the first steering bracket.

8. The kit of the scooter according to claim 1, further comprising a handle lever arranged on the deck assembly.

9. The kit of the scooter according to claim 8, wherein the first end of the deck assembly is provided with a first mounting seat, the second end of the deck assembly is provided with a second mounting seat, and a bottom of the handle lever is mounted on either of the first mounting seat and the second mounting seat.

10. The kit of the scooter according to claim 9, wherein the deck assembly comprises a deck and a frame, the deck is connected to the frame, and at least one of the first mounting seat and the second mounting seat is detachably mounted on the frame.

11. The kit of the scooter according to claim 8, wherein the kit further comprises a controller arranged on the handle lever and provided with at least one of a wireless transmitter and a wire harness connected to the power wheel assembly.

12. The kit of the scooter according to claim 11, wherein the controller comprises a housing, a circuit board and a button, the circuit board is arranged inside the housing, the button is arranged on a surface of the housing, and the housing is arranged on the handle lever.

13. The kit of the scooter according to claim 1, wherein the deck assembly comprises a deck and a frame, the deck is connected to the frame, a first end of the frame is connected to the first steering assembly, a second end of the frame is connected to the second steering assembly, and the first end of the frame is further provided with a hand grip extending in a direction facing away from the second end of the frame.

14. The kit of the scooter according to claim 1, wherein the kit further comprises a first damping assembly connected between the driven wheel assembly and the deck assembly.

15. The kit of the scooter according to claim 1, wherein the kit further comprises a second damping assembly connected between the connecting device and the deck assembly.

16. The kit of the scooter according to claim 1, wherein the kit further comprises a first damping assembly connected between the driven wheel assembly and the deck assembly; and the kit further comprises a second damping assembly connected between the connecting device and the deck assembly.

17. A scooter, comprising:
a kit of a scooter comprising:
  a deck assembly;
  a first steering assembly arranged to a first end of the deck assembly;
  a driven wheel assembly arranged to the first steering assembly and configured to rotate relative to the deck assembly through the first steering assembly;
  a second steering assembly arranged to a second end of the deck assembly; and
  a connecting device arranged to the second steering assembly and configured to rotate relative to the deck assembly through the second steering assembly; and
a power wheel assembly arranged to the connecting device;
wherein the connecting device comprises a first connecting bracket and a second connecting bracket, the first connecting bracket is connected to the second steering assembly, the second connecting bracket is connected to a side of the first connecting bracket facing away from the second steering assembly, and the second connecting bracket is a connecting bracket of the connecting device configured to be connected to the power wheel assembly.

18. The scooter according to claim 17, wherein the second steering assembly comprises a first steering bracket, a second steering bracket and a steering shaft, the first steering bracket is arranged to the second end of the deck assembly, the second steering bracket is arranged to the connecting device, and the steering shaft is arranged between the first steering bracket and the second steering bracket, to allow the first steering bracket to rotate relative to the second steering bracket.

19. A kit of a scooter, comprising:
a deck assembly;
a first steering assembly arranged to a first end of the deck assembly;
a driven wheel assembly arranged to the first steering assembly and configured to rotate relative to the deck assembly through the first steering assembly;
a second steering assembly arranged to a second end of the deck assembly; and
a connecting device arranged to the second steering assembly and configured to rotate relative to the deck assembly through the second steering assembly, the connecting device being a device of the kit configured to be connected to a power wheel assembly;
wherein the second steering assembly comprises a first steering bracket, a second steering bracket and a steering shaft, the first steering bracket is arranged to the second end of the deck assembly, the second steering bracket is arranged to the connecting device, and the steering shaft is arranged between the first steering bracket and the second steering bracket, to allow the first steering bracket to rotate relative to the second steering bracket;
wherein the steering shaft is arranged obliquely relative to a horizontal plane, and the connecting device is lower than the second end of the deck assembly.

\* \* \* \* \*